Oct. 8, 1968            G. B. MILLER            3,404,853

RADIAL TURBINE ENGINES AND APPLICATIONS THEREOF

Filed Dec. 12, 1966                            5 Sheets-Sheet 1

INVENTOR
GEORGE B. MILLER
BY
ATTORNEY

Oct. 8, 1968  G. B. MILLER  3,404,853
RADIAL TURBINE ENGINES AND APPLICATIONS THEREOF
Filed Dec. 12, 1966  5 Sheets-Sheet 2

INVENTOR
GEORGE B. MILLER
BY
ATTORNEY

Oct. 8, 1968  G. B. MILLER  3,404,853
RADIAL TURBINE ENGINES AND APPLICATIONS THEREOF
Filed Dec. 12, 1966  5 Sheets-Sheet 3

INVENTOR
GEORGE B. MILLER
BY
ATTORNEY

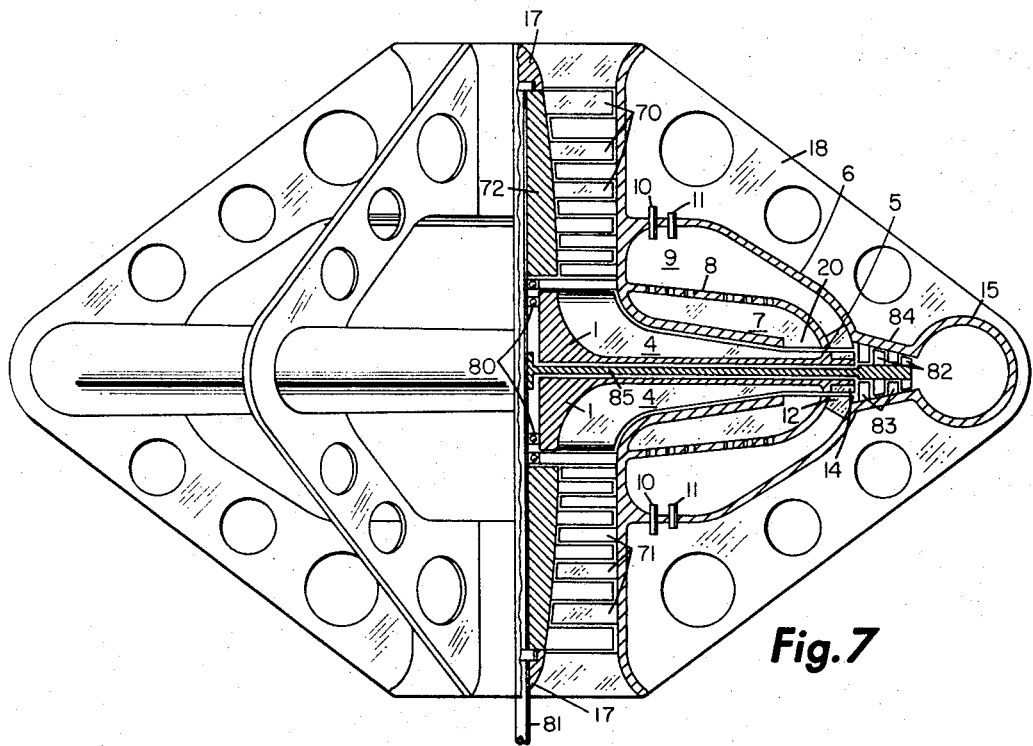

United States Patent Office 3,404,853
Patented Oct. 8, 1968

3,404,853
RADIAL TURBINE ENGINES AND
APPLICATIONS THEREOF
George B. Miller, 5005 Aspen, Bow-Mar,
Littleton, Colo. 80120
Filed Dec. 12, 1966, Ser. No. 593,833
19 Claims. (Cl. 244—55)

ABSTRACT OF THE DISCLOSURE

A gas turbine engine comprising a supportive disc rotating about a center point, a plurality of compressor blades upstanding from said disc and radially spaced from said center point, an annular combustion zone axially spaced from and surrounding a portion of said compressor blades, a series of turbine buckets upstanding from said supportive disc and at a greater distance from said center point than said compressor blades, a housing for directing air to said compressor blades and for collecting exhaust gases from said turbine buckets and means for mounting said gas turbine engine in an aircraft so that said housing may be rotated to vary the direction of said exhaust gases.

---

The present invention relates to new turbine engines and vehicles propelled by such engines and in particular relates to turbine engines having a disc-like configuration for their major element.

Virtually all previous gas turbine engines have included at least three separate parts, a compressor, a combustor, and a driving turbine uit. These components have generally been located successively along the length of a central rotating shaft. In many engines more than one of each component have been included as in multiple stage compressor configurations, etc. Such engines have necessitated relatively long shafts with their attendant support problems. Since most conventional turbine engines subject at least some of their bearings to highly elevated temperatures, special bearing and special lubrication methods have been required. In addition, such conventional engines are relatively complex and involve a number of sub-assemblies for the above components.

The present invention provides new engine configurations which combine the above three components to markedly reduce the number of parts per engine. In addition, the turbine engines of the present invention permit the grouping of the above three basic components in a concentric relationship, thus shortening the required shaft length and permitting all shaft bearings to be located in relatively cool environments remote from the combustion zone and hot exhaust gases.

The present invention includes, in preferred embodiments, turbine engines which comprise in combination a supportive disc spinnably mounted at its center point, a plurality of compressor blades upstanding from the said disc, said blades being arranged radially about the center point of said supportive disc; an annular combustion zone surrounding at least a portion of said compressor blades and lying in a plane substantially parallel to said supportive disc; and a series of turbine buckets upstanding from said supportive disc radially fixed on said supportive disc and located at a greater distance from said center point than are said compressor blades, said turbine buckets being so arranged as to receive gases from said combustion zone, derive power from said gases, and discharge said gases, all with said gases flowing in a plane substantially parallel to said supportive disc and at least partially radial to said supportive disc; said compressor blades, said combustion zone and said turbine buckets all being positioned on the same side of said disc; and suitable housing means for directing air into the space between the inner portions of said compressor blades and conducting said exhaust gases away from the outer portions of said turbine buckets.

In particularly preferred embodiments the supportive disc is fixed perpendicularly at its center point to a shaft which is rotatably mounted in a plurality of bearings, located a fixed distance from the combustion zone and exhaust gases so that the bearings operate in an environment of less than about 250° F., permitting use of relatively inexpensive conventional alloys in the bearings.

The invention will be more fully understood by reference to the following drawings of specific embodiments.

FIGRE 1 is a section elevation of a preferred embodiment of the present invention utilizing two complete engines consisting of compressors, combustion zones and turbine buckets, said engines being mounted on opposite sides of a single supportive disc.

FIGURE 7 shows a twin-spool type of engine having both a high pressure and a low pressure stage.

FIGURE 8 shows an especially preferred embodiment of the present invention utilizing a power takeoff turbine having auxiliary blades mounted independently of the supportive disc, said auxiliary blades being positionable in and removable from the exhaust stream exiting from the turbine buckets on the supportive disc, said auxiliary turbine blades driving a power takeoff shaft.

The drawings herein are not drawn to scale and proportions can vary.

Figure 1:
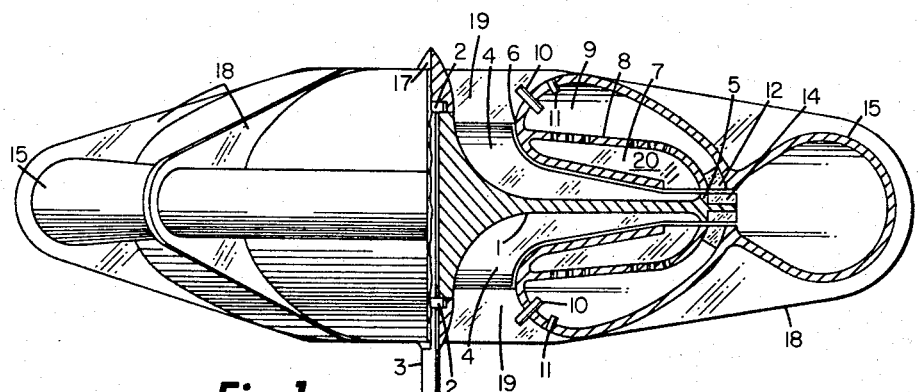
Figure 2:
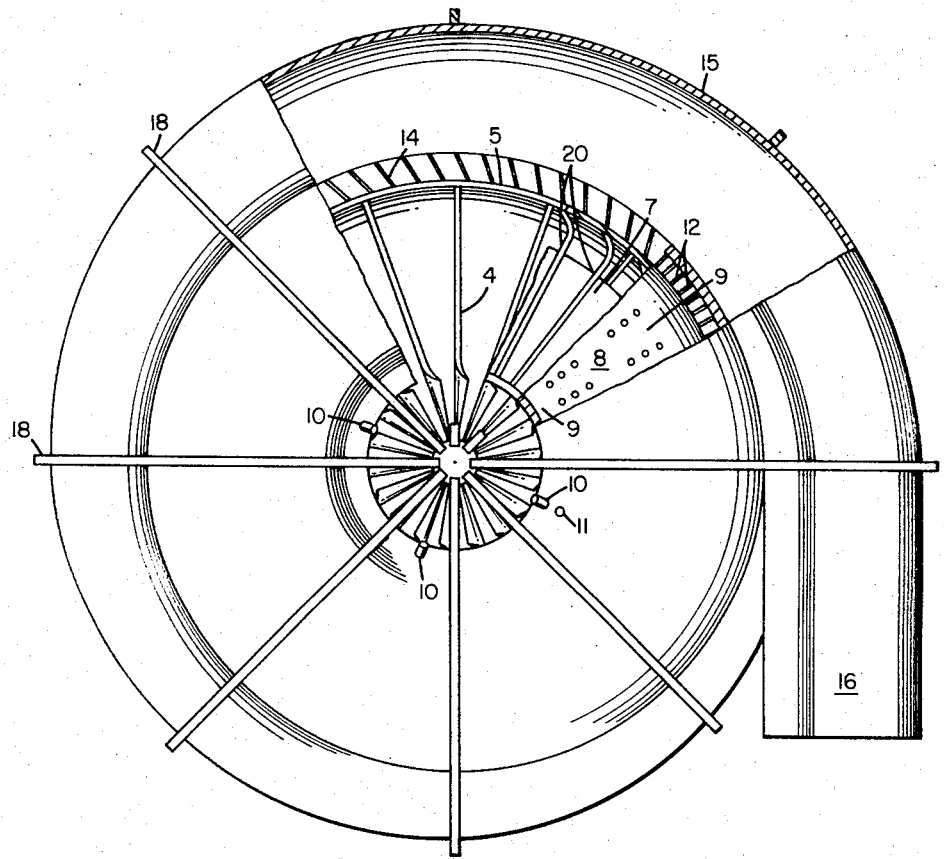
FIGURE 2 is a plan view of the engine of FIGURE 1.

In FIGURE 1 the supportive disc 1 is spinnably mounted by means of shaft 3 on a pair of bearings 2. Upstanding from the supportive disc are two sets of centrifugal compressor blades 4, one set on each side of the disc 1. Concentric deflector rings 5 are upstanding from the supportive disc 1 at a point some distance away from its center point. Just above and below the deflector rings 5 are combustors 6, each consisting of a compression zone 7 separated by a perforated partition 8 from a combustion and mixing zone. Within the compression zone 7 there are located stationary radial diffuser blades 20. Within the combustion and mixing zone 9, there is located a series of circumfrentially spaced fuel injectors 10. Ignitors 11 for starting the engine are also located in the combustion and mixing zone 9. A series of deflector vanes 12 directs the exhaust gases from chamber 9 to impinge directly upon a set of turbine buckets 14 upstanding from the outermost portion of the supportive disc 1. An exhaust volute 15 collects the exhaust gases and discharges them substantially tangentially from an exhaust nozzle. The exhaust volute 15 and nozzle 16 are shown in FIGURE 2 which is a plan view of the engine of FIGURE 1. Webs 18 hold the shaft bearings 2, the combustor 6, the exhaust volute 15 and other components rigidly in position. Hub 17 provides a center connection for the webs 18, without substantially interfering with air entrance 19. A conventional turbine engine starting motor (not shown) is suitably coupled to shaft 3.

In operation the disc 1 is initially spun by the starting motor, air is drawn into the entrance zone 19 under the action of the centrifugal compressor blades 4. The air is accelerated radially and is deflected by deflector ring 5 into the compression zone 7 of the combustor 6. In the compression zone 7 of the combustor 6 the air is further compressed due to a sudden reduction in air velocity caused by stationary radial diffuser blades 20 located within the compression zone 7 of the combustor 6. The air then moves through the perforations in partition 8, some air coming near the fuel injector 10 where it receives fuel and is ignited by burning gases within the combustion and mixing zone 9 of the combustor 6. Another portion of the air diffuses through other perforations in partition 8 which are distant from the fuel injectors 10. Hot combustion products from the area around the fuel injectors 10 then mix with this additional air, heating it and further increasing the kinetic energy of the gases which then leave the combustor 6 by passing through deflection vanes 12. The gases leaving the deflection vanes 12 impinge upon the turbine buckets 14 upstanding from the supportive disc 1 at such an angle as to impart rotary momentum to the disc and sustain its rotation. The gases cannot pass through the disc 1 which is imperforate, but are instead ejected radially from the outer ends of the turbine buckets 14 discharging into an exhaust volute 15.

The engine of FIGURES 1 and 2 can be utilized either to power shaft mounted equipment, e.g., electric generators, or can be used conventionally as a jet engine with the shaft merely providing power for the necessary auxiliaries, e.g., fuel pumps, with the jet thrust provided by the exit nozzle 16.

While the engine of FIGURES 1 and 2 is shown as a double engine with two sets of compressors, combustors and turbine blades, and while this configuration is preferred for many applications, the engine may be modified to be a single engine having only a single set of the aforementioned components on one side of the disc.

Figure 3:
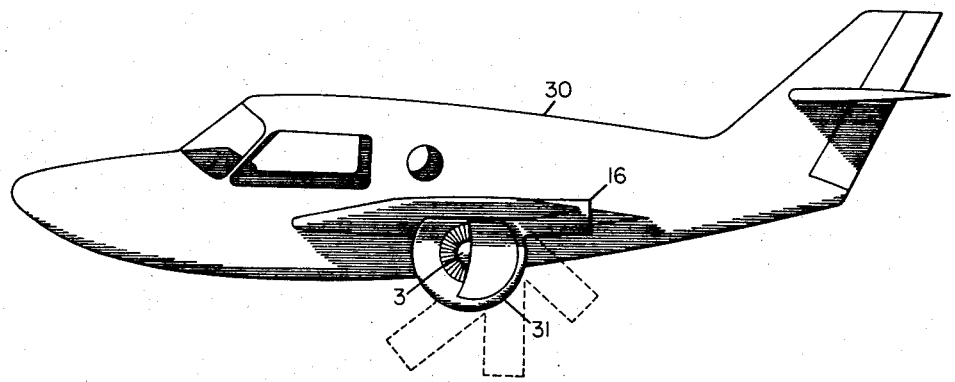
FIGURE 3 is a diagram of an aircraft powered by the engines of FIGURES 1 and 2 with the engine being mounted so as to provide a directable thrust.

FIGURE 3 is the diagram of an airplane having the engine of FIGURES 1 and 2 wing-mounted with the shaft 3 perpendicular to the fuselage 30 of the airplane. As shown by the dotted-line positions, the engine 31 can be rotated about its shaft in order to cause the exhaust nozzle 16 to direct the exhaust gases at various angles to the major axis of the fuselage 30. This permits capability for short takeoffs and landings as well as vertical takeoffs and landings.

Control of the thrust angle of the engine 31 of FIGURE 3 can be provided by conventional means, e.g., pinion and circular rack, or hydraulic actuators.

Figure 4:
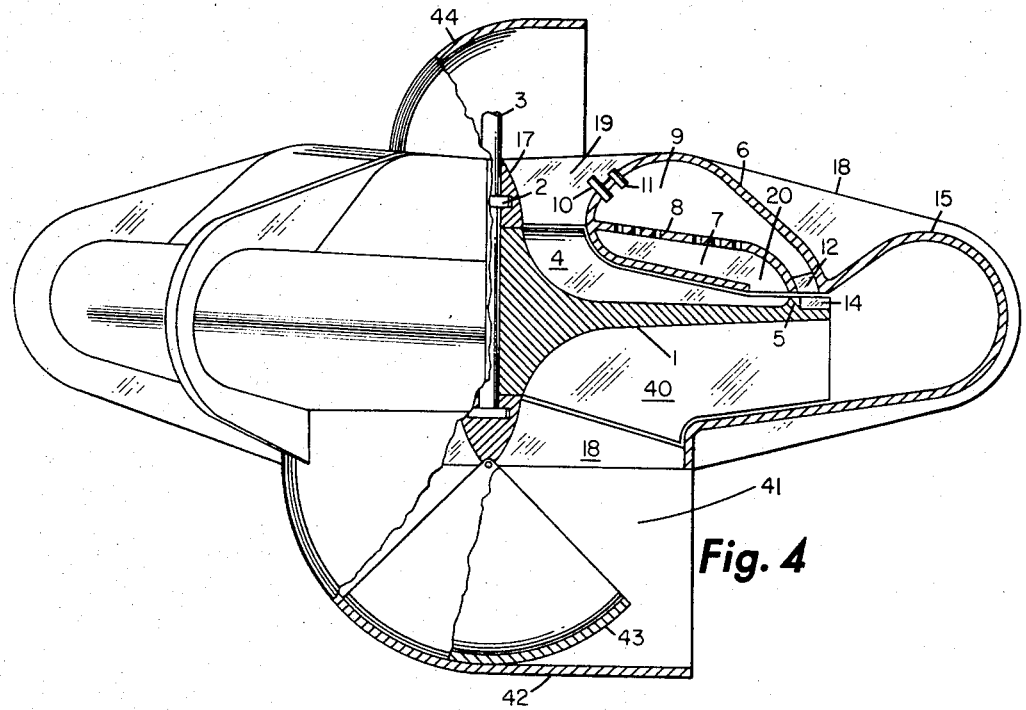
FIGURE 4 is a section elevation of a fan jet engine according to the present invention.

FIGURE 4 shows an engine of the type of the engine of FIGURES 1 and 2 with the second set of compressor blades, combustor and turbine buckets replaced with a set of substantially radial impeller blades to provide fanjet action.

In FIGURE 4 elements 1 through 12, 14, 15, 17, 18, 19 and 20 of FIGURE 4 function identically as the respective elements were described with respect to FIGURES 1 and 2. Thus the whole upper portion of the engine of FIGURE 4 constitutes a power generator which drives the supportive disc 1 providing a normal jet action from the exhaust volute 15 and additionally powering impeller blades 40 drawing air through a second air intake 41 and discharging this additional air into the exhaust volute 15. This additional air provides a higher mass flow from the exhaust volute 15 of the engine permitting greater thrust and efficiency at low air speeds and altitudes when used in aircraft.

FIGURE 4 also shows an optional feature in the air scoop 42 with movable clam shell 43 which permits varying the mass flow through the fan side of the engine. This optional adjustable clam shell provides capability for variable thrust magnitude without substantial variation in rotary engine speed. A second scoop 44 without the variable clam shell can be provided on the opposite side of the engine to direct air into the power generator side through air inlet 19.

Figure 5A:
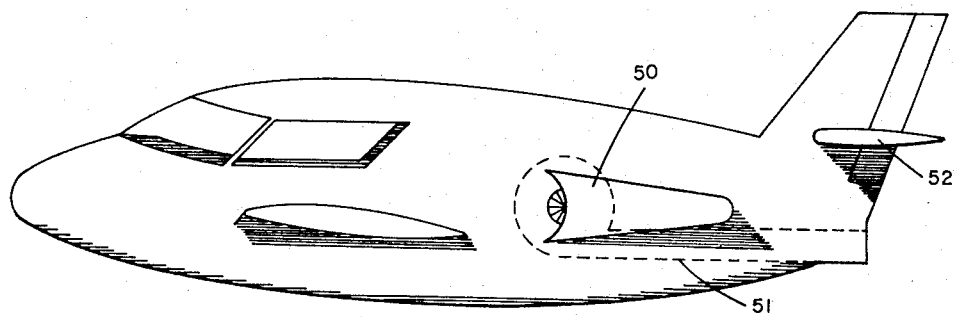
FIGURE 5A is a diagram of the engine of the present invention mounted in the rear of the fuselage of an airplane with the exhaust directed out at the tail.

FIGURE 5A shows the engine of drawings 1 and 2 or of drawing 4 mounted in the fuselage of the aircraft with air scoops 50 extending outward from either side of the airplane with the exhaust 51 being emitted from the tail at a point below the stabilizer 52.

Figure 5B:
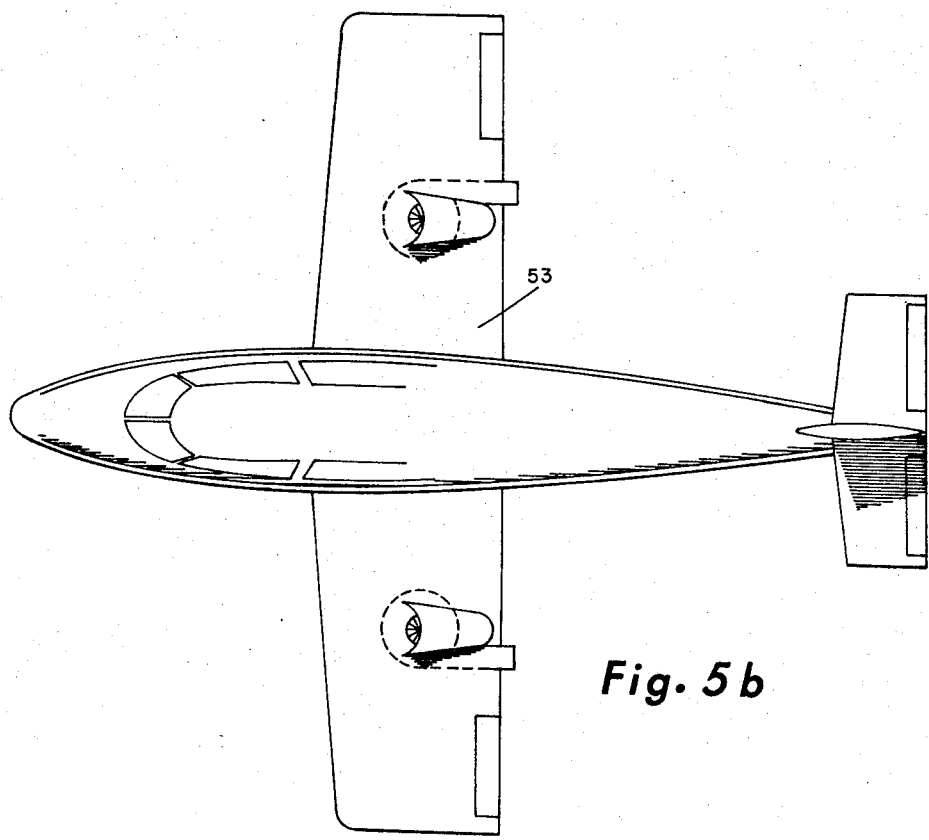
FIGURE 5B is a diagram of the present invention mounted within the wing of an airplane.

FIGURE 5B shows still another configuration with the engines mounted flat in the wing 53 of the airplane. Note that in all of the configurations of FIGURE 3 and of FIGURES 5A and 5B the shaft of the turbine of the present invention is perpendicular to the normal direction of flight of the aircraft. This is an important result of the radial tangential discharge of gases from the turbine buckets of the engines of the present invention.

Figure 6:
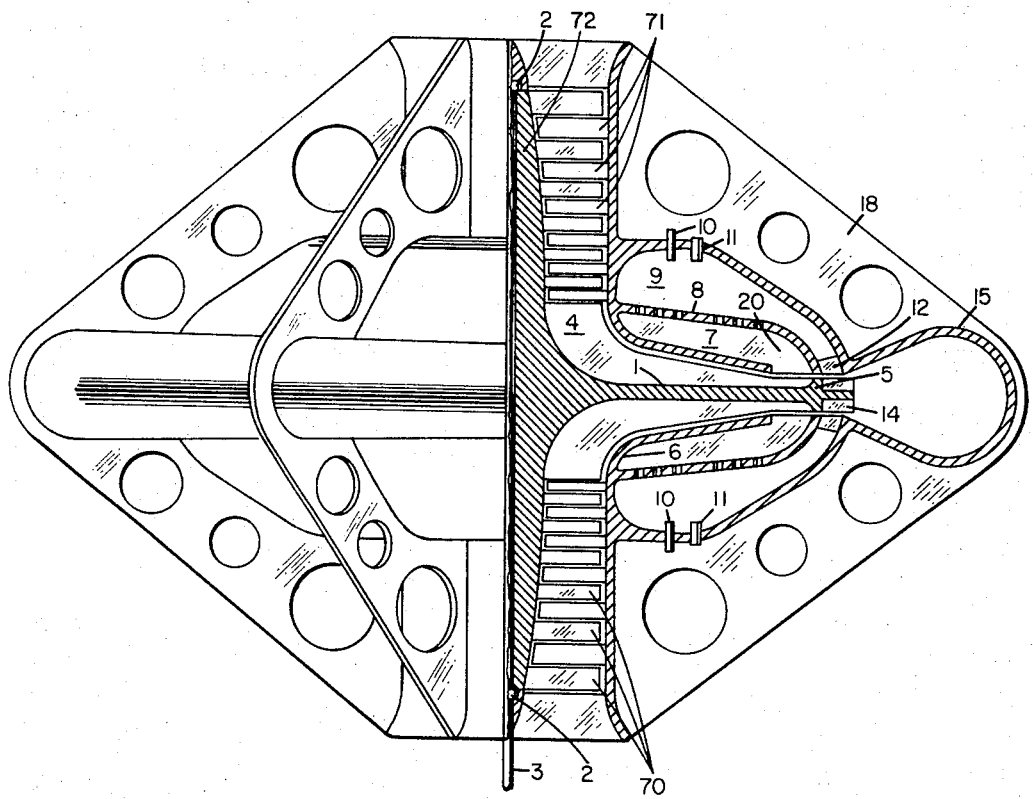
FIGURE 6 shows the engine of FIGURE 1 fitted with an axial forecompressor.

FIGURE 6 shows the engine of FIGURES 1 and 2 to which has been added a pair of forecompressors comprising a number of axial compression stages, each comprising stator blades 71 and rotor blades 70 with the latter being driven by a hub 72 extending from shaft 3 of the engine.

This axial forecompressor increases the pressure of the air entering the centrifugal compressor blades 4 thereby providing a higher overall compression ratio and increasing the efficiency of the engine when used for high altitude or high speed applications.

It should be understood that a centrifugal forecompressor with suitable exhaust conduit can be substituted for the axial forecompressor of FIGURE 6.

FIGURE 7 shows a high thrust, high performance engine of the present invention utilizing the "twin-spool" principle. In FIGURE 7, elements 1, 4 through 12, 14, 15, 17, 18 and 20 function as described with respect to FIGURES 1 and 2. The shaft 81 is not connected to the supportive discs 1, but instead the discs rotate freely about the shaft 81 on bearings 80. The exhaust gases from turbine buckets 14 pass through a second set of turbine blades 82 and stator blades 83. The stator blades 83 are mounted on the housing 84. The turbine blades 82 are circumferentially mounted on an additional disc or radial member 85 which drives shaft 81 which in turn is coupled to hub 72 which provides axial forecompression through the action of rotor and stator blades, 70 and 71 respectively, which function as described previously with respect to FIGURE 6. This engine incorporates the radial ejection which is a basic feature of the present invention and in addition provides the high engine efficiencies over a wide range of air speeds and altitudes which is characteristic of engines utilizing the "twin-spool" principle.

FIGURE 8 shows a preferred embodiment of the present invention which is particularly adaptable to those applications in which a "clutching" action or variable power at relatively constant engine speeds is desirable. Such applications particularly include the use of the engines of the present invention for propulsion of automobiles and other shaft-powered vehicles.

In FIGURE 8, elements 1 through 12, 14, 15, 17, 18, 19 and 20 function as respectively previously described with regard to FIGURE 7 and FIGURES 1 and 2. Gases from turbine buckets 14 exit through a set of stator blades 91 and turbine blades which power a second disc or other radial member 92 which in turn powers takeoff shaft 93 separated from shaft 3 by suitable bearings 94. Suitable support members 95 provide rigidity for element 92. Suitable means, e.g. lever assembly 96, is provided for moving element 92 axially along shaft 93 so as to move turbine blades 90 in and out of the exhaust stream exiting from the turbine buckets 14. By moving element 92 axially the torque on the shaft 93 can be varied from zero up to the maximum torque available from the engine.

In special preferred embodiments the turbine blades 90 may be twisted so that as they are inserted into and withdrawn from the gas stream exiting from the turbine buckets 14 they present a different pitch angle to the exhaust stream.

It will be understood by those skilled in the art from a reading of the above embodiments of the invention that the invention is susceptible to a wide variety of variations and modifications and that it may be utilized in a number of other applications, e.g. ground-effect machines, boats and helicopters. It is to be understood that the above-described embodiments are merely illustrative of the invention and that the claims appended hereto are to be considered as including all such variations and modifications as would be apparent to those skilled in the art.

What is claimed is:

1. A turbine engine comprising in combination a supportive disc spinnably mounted at its center point, a plurality of compressor blades upstanding from said disc, said blades being arranged radially about the center point of said supportive disc, and stationary means defining an annular combustion zone axially spaced from and surrounding at least a portion of said compressor blades, the plane of said combustion zone being substantially parallel to said supportive disc, a series of turbine buckets upstanding from said supportive disc, radially fixed on said supportive disc and located at a greater distance from said center point than are said compressor blades, said turbine buckets being so arranged as to receive gases from said combustion zone, derive power from said gases and discharge said gases all with said gases flowing substantially in a plane parallel to said supportive disc and at least partially radial to said supportive disc; said compressor blades and conducting said exhaust gases away buckets all being positioned on the same side of said supportive disc; and suitable housing means for directing air into the space between the inner portions of said compressor blades and conducting said exhaust gases away from the outer portions of said turbine buckets.

2. The turbine of claim 1 wherein said supportive disc is fixed perpendicularly at its center point to a shaft; said shaft being rotatably mounted in a plurality of bearings, said bearings being a sufficient distance from said combustion zone and exhaust gases that said bearings are located in an environment of less than about 250° F. when said turbine is in normal operation.

3. The turbine of claim 1 wherein said supportive disc is substantially imperforate to air flow and extends out to the maximum radius of the turbine buckets.

4. The turbine of claim 1 wherein said supportive disc has a second operative set of compressor blades, turbine buckets and combustion zone, all positioned on the reverse side of said disc in substantially mirror image relationship to said first set so as to provide dual motive means on a single supportive disc.

5. An aircraft comprising the engine of claim 1 mounted with said supportive disc substantially parallel to the path of forward travel of said aircraft.

6. The aircraft of claim 5 wherein said turbine engine is mounted so that said housing can be rotated substantially in the plane of said disc and where said exhaust gases exit through an exhaust nozzle extending from said housing whereby the direction of said exiting gases can be varied by rotation of said housing.

7. A turbine of claim 1 wherein the flow of air through said engine is substantially parallel to the plane of said supportive disc and said flow continues to be substantially parallel to said plane until it exits from said turbine buckets, excepting only flow of said gases within said combustion zone.

8. A fanjet turbine of the type of claim 7 wherein a single set of compressor blades, combustion zone and turbine buckets are located on one side of said disc and wherein a set of substantially radial impeller blades are located on the opposite side of said disc whereby said impeller blades are moved by the motive power of said set of compressor blades, combustion zone and turbine buckets so that said impeller blades force air into an exhaust conduit wherein said air mixes with the exhaust gases from said turbine buckets.

9. The fanjet turbine of claim 8 wherein variable flow restriction means is provided to restrict the flow of air into said impeller blades.

10. An aircraft comprising at least one engine of claim 1 mounted in the fuselage having air scoops extending outward from said fuselage and with the exhaust gases from said turbine being emitted at a point near the tail of said aircraft, said supportive disc lying substantially in the plane of the longitudinal axis of said fuselage.

11. A vehicle propelled by at least one turbine engine of claim 1 wherein said engine is mounted so that the plane of said supportive disc is parallel to the principal direction of motion of said vehicle.

12. An aircraft having wings and comprising at least one of the engines of claim 1 mounted in said wings so that said supportive disc lies substantially within said wings in a plane substantially parallel to the principal plane of said wings.

13. A turbine engine of claim 1 wherein said supportive disc is fixed perpendicularly at its center point to a rotatable shaft and said shaft drives an axial compressor comprising a set of rotor blades and stator blades whereby air entering said engine is first compressed by said axial compressor and thereafter compressed by said compressor blades mounted on said supportive disc.

14. A turbine engine of claim 4 wherein said supportive disc is fixed perpendicularly at its center point to a rotatable shaft and so said shaft drives an axial compressor comprising a set of rotor blades and stator blades whereby air entering said engine is first compressed by said axial compressor and thereafter compressed by said compressor blades mounted on said supportive disc.

15. Turbine engines of claim 1 wherein said supportive disc is mounted at its center point to rotate freely about a shaft substantially perpendicular to said supportive disc, wherein said shaft is rotated by a second set of turbine buckets operating independently of said supportive disc and positioned so as to be moved by said exhaust gases exiting from said first set of turbine buckets, said shaft driving an axial compressor comprising rotors and stators, with said axial compressors being so positioned as to receive and compress air and discharge said air after compression to the inner portions of said compressor blades mounted on said supportive disc.

16. The turbine engines of claim 15 wherein said second set of turbine blades move in the same plane with and concentrically to said first set of turbine buckets mounted on said supportive disc so as to provide a "twin-spool" type of turbine engine.

17. The turbine engine of claim 16 comprising two supportive discs having compressor blades and turbine buckets, said supportive discs being mounted in substantially mirror image relationship and said shaft extending through both said supportive discs and being connected to two axial compressors, each of which is positioned to discharge compressed air into the inner portion of one of said sets of compressor blades mounted on said supportive discs.

18. A turbine engine of claim 1 wherein said supportive disc is fixed perpendicularly at its center point to a rotatable shaft and said shaft drives a centrifugal forecompressor comprising a set of rotor blades and stator blades whereby air entering said engine is first compressed by said centrifugal forecompressor and thereafter compressed by said compressor blades mounted on said supportive disc.

19. The turbine engine of claim 1 wherein only a single set of said compressor blades and turbine buckets is provided mounted on one side of said supportive disc and wherein an independent second set of turbine buckets is arranged to receive exhaust gases exiting from said first set of turbine buckets and wherein means is provided for inserting and withdrawing said second set of turbine buckets from the gases exiting from said first set of turbine buckets and wherein said second turbine buckets are operably connected to drive a shaft whereby the power transmitted to said shaft by said second set of turbine buckets may be varied by inserting or withdrawing said second set of turbine buckets from said gases exiting from said first set of turbine buckets.

References Cited

UNITED STATES PATENTS

| | | | |
|---|---|---|---|
| 1,868,143 | 7/1932 | Heinze | 60—39.35 |
| 2,272,676 | 2/1942 | Leduc | 60—39.36 |
| 2,490,623 | 12/1949 | Elsby | 60—39.35 XR |
| 2,694,291 | 11/1954 | Rosengart | 60—39.36 |
| 2,850,250 | 9/1958 | Smith | 60—39.35 XR |

CARLTON R. CROYLE, *Primary Examiner.*